Feb. 12, 1952  J. C. GORDON  2,585,108
METHOD OF FORMING EMBOSSED RUG CUSHIONS
Filed Nov. 3, 1948  2 SHEETS—SHEET 1

INVENTOR.
BY Jack C. Gordon
Daniel G. Cullen
Attorney

Feb. 12, 1952          J. C. GORDON          2,585,108
METHOD OF FORMING EMBOSSED RUG CUSHIONS
Filed Nov. 3, 1948          2 SHEETS—SHEET 2
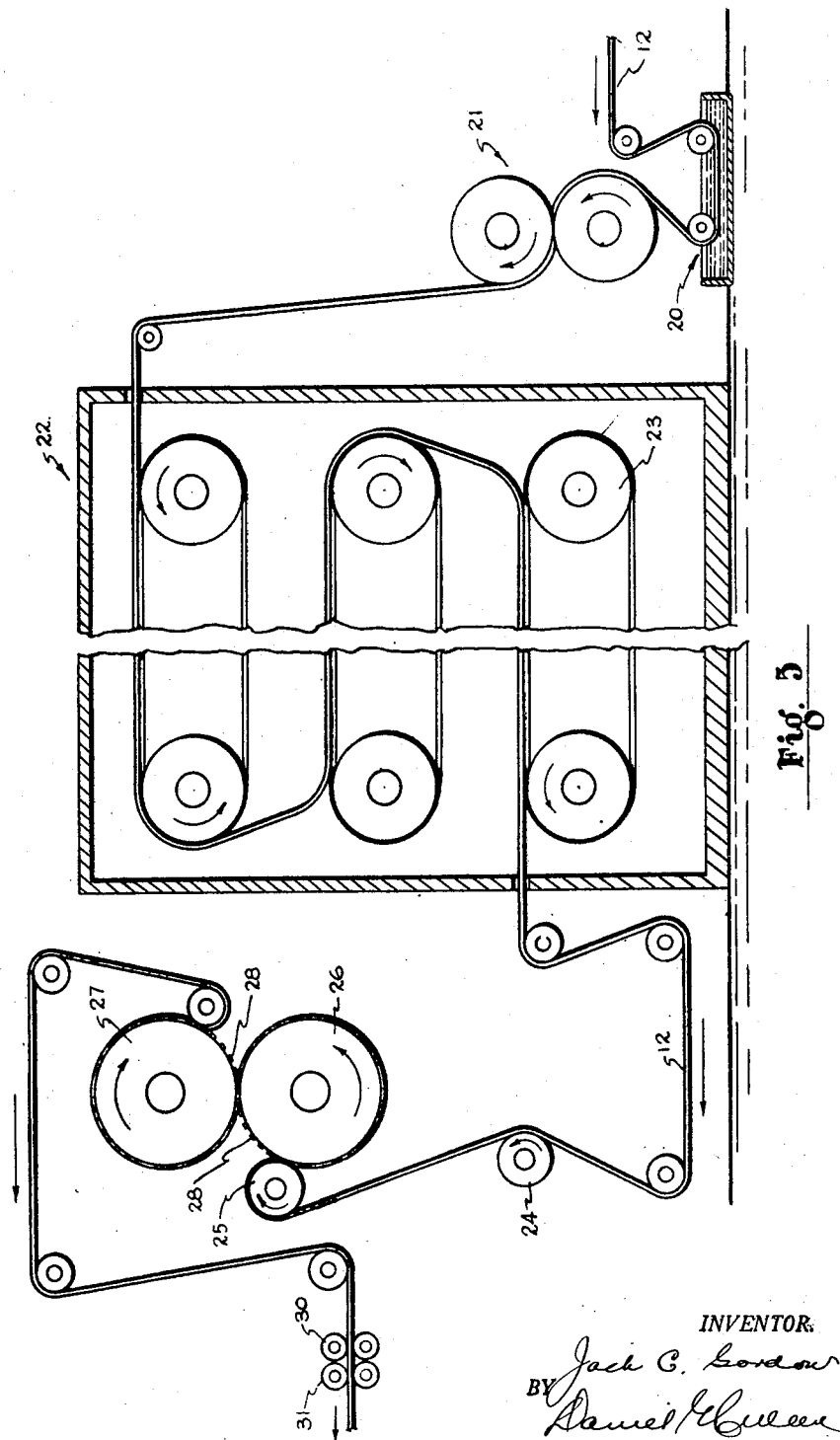

Patented Feb. 12, 1952

2,585,108

UNITED STATES PATENT OFFICE 2,585,108

METHOD OF FORMING EMBOSSED RUG CUSHIONS

Jack C. Gordon, Detroit, Mich., assignor to Allen Industries, Inc., Detroit, Mich.

Application November 3, 1948, Serial No. 58,129

2 Claims. (Cl. 117—10)

This application relates to methods for making embossed rug cushions, and particularly aims to provide methods and apparatus for making embossed, rigid and nonstretchable rug cushions of felt, such as felted jute or hair, and having both surfaces coated with a cured sealing compound, and embossed in any suitable pattern.

The sealing compound may be rubber latex, either natural or synthetic, or any rubber dispersion, either natural or synthetic. One suitable compound is described in Patent No. 2,402,837 of June 25, 1946. It is known as chloroprene or neoprene and is identified by the formula chlore-2-butadiene-1,3. It is a rubber emulsion or dispersion compounded with typical accelerators, age retarders, vulcanizing agents and other basic ingredients, fillers, pigments and the like. For the purposes of this application it may be considered that any suitable sealing compound of the rubber latex, or rubber dispersion class, of which neoprene is an example, may be utilized.

The present invention aims to provide methods and apparatus for making a rug cushion or pad, both of whose surfaces are coated with an above mentioned sealing compound and embossed, and whose edges are beveled.

A further object of this invention is to provide methods and apparatus for making a rug cushion which will possess little or no stretch as compared to the customary rug cushions well known in the art. This advantage is obtained by sealing the cushion on both its surfaces with an above mentioned sealing compound and thus securing the pad or cushion to a permanently sealed and definite dimension.

A further object of the invention is to provide methods and apparatus for making a rug cushion which is readily manageable, easy to manufacture and which can be cut to accurate size, without making any additional allowances for future stretch, as is now customary in the rug cushion industry, thereby saving substantial savings in labor costs, equipment, time and materials necessary to produce these rug cushions.

A further object of the invention is to provide methods and apparatus for making a rug cushion having on both surfaces cured coatings of an above mentioned sealing compound which are of a character that will not deteriorate or revert to a tacky or sticky stage.

A further object of the invention is to provide methods and apparatus for making a rug cushion having sufficient rigidity to facilitate ease of handling between the seller and the user. The seller may with ease cut small pieces from large rolls and may lay the cushion to the floor without wrinkles or bumps. The rigid coated pad will afford a greater degree of ease in handling than the customary limp and uncoated pad.

A further object of the invention is to provide methods and apparatus for making a rug cushion whose edges are beveled, trimmed and sealed, thus allowing the carpeting on the cushion to fall gradually to the floor and at the same time present a pleasing and improved appearance of the rug along the margin.

In order to afford an understanding of this invention, it will be described in connection with illustrative embodiments thereof shown in the accompanying drawings; further purposes, features and advantages of this invention will be apparent from the following description of this invention and of the embodiments thereof shown in the drawings, wherein Fig. 1 is a fragmentary plan view of a rug cushion made by methods and apparatus of the invention.

Fig. 5 is a diagrammatic view of apparatus for forming the rug cushion.

Figure 1:
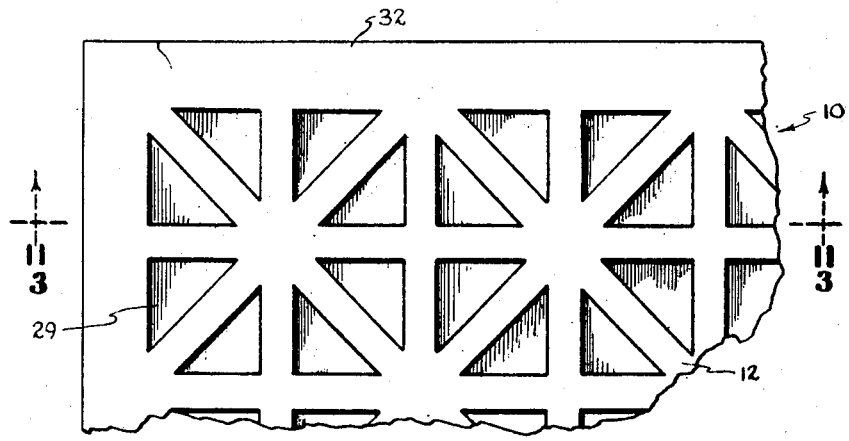
Figure 2:
Fig. 2 is a vertical section of a felt sheet before being coated with an above mentioned sealing compound on its surfaces.
Figure 3:
Fig. 3 is a section view as if on line 3—3 of Fig. 1, showing the rug cushion after it is coated and with an edge shown as singly beveled.

One preferred embodiment of rug cushion made by methods and apparatus of the invention is shown in Figs. 1–3. The cushion is indicated generally by reference numeral 10 and consists of a base sheet 12 made of felt. The felt will consist of jute or hair or a percentage of jute and hair fibers garnetted and needled to make a felt product of a given density. A form of reinforcement such as tobacco cloth or burlap, not shown, may be used in the center of the felt 12 if a stronger product is desired.

Both faces of the pad are coated, as will later be described, with cured sealing compound coatings 13 whose details and provision will later be described.

As the first step in the manufacture of the rug cushion, the felt base 12 is passed through a dye bath 20, Fig. 5, and then to surplus squeezing rollers 21 and a drying oven 22 containing drying rolls 23. There the felt base is dried and passed on to rolls 24—25 where the sealing or coating compound is applied to both surfaces.

The coating of the felt sheet 12 can be accomplished by various well known methods. It may be applied by roll coating, as shown, or it could be accomplished by spray coating, or a combination of the two methods could be used. In any event, after the felt sheet 12 has passed through the drying oven, its surfaces are coated with a coating compound.

From here the coated felt sheet is passed to curing and embossing compression rollers 26—27 in the form of separately and successively acting hollow curing rollers having their outer surfaces provided with male protuberances 28 to form an indented and densified pattern in the travelling coated felt sheet, the pattern of indentations being shown at 29. The rollers 26—27 are provided with internal electrical heating means, not shown, for curing the coatings on the sheet. The heating requirement of the rollers 26—27 may range between 180° F. to 450° F., depending upon which type of compound is used for coating the felt sheet. Air blown through the hollow rollers 26—27 will aid in the drying and curing of the coatings. Regardless of the form, apparatus should be used to effect complete curing of the coatings.

From here the coated sheet may be passed to two sets of rollers 30—31 which respectively bevel and trim the edges of the coated felt sheet as shown at 32 in Fig. 3.

Figure 4:
Fig. 4 is a view like Fig. 3 but showing the edge of the rug cushion doubly beveled.

The beveling may be of the form shown in Figs. 1-3, or of the form shown in Fig. 4; the former is better from the point of view of having the rug cushion lie flat, but the latter is better from the point of view of permitting the rug cushion to be reversible on the floor.

The sealing compound may be mixed with various types of anti-oxidants and curing ingredients and stabilizers to permit a perfect application and curing of the sealing compound with complete assurance that no oxidation or deterioration will take place after the sealing compound has been applied to the felt sheet and cured.

It will be observed that the center portion of the rug cushion is not at all penetrated by the coatings of sealing compound on the opposite surfaces of the rug cushion, nor is densified or cured by the compression rollers 26—27. The projections 28 of these rollers are so designed as merely to densify and cure the outer surfaces of the rug cushion, stiffening these surfaces, but leaving the center portion of the felt sheet comparatively unchanged, and hence, pliable in accordance with the characteristics of the felt sheet before coating.

While this invention has been described in connection with certain illustrative embodiments thereof, it is to be understood that this has been done merely for exemplification and that the scope of the invention is to be limited only by the following claims.

What I claim is:

1. The method of forming a floor covering rug cushion underlay comprising a thick, loosely matted and felted fiber cushion base having a substantially spongly resilience by having a pattern embossed on at least one sufrace thereof, said pattern comprising a suitable configuration of a plurality of embossed indentations, each of said indentations being separated from each other by unindented ridges, both indented and raised ridge portions lying solely in a surface of the rug cushion, and cured as a continuous film of a resilient rubber composition having sufficient thickness to be identifiable as a coherent rubbery layer having integrally included therein the fibers lying solely on the surface only of said fiber base, whereby said surface will retain its configuration, having enhanced cushioning effect, said method comprising applying a liquid coating to at least one surface of the felted matted fiber base, said coating consisting of aqueous rubber latex whereby the solids are retained on the surface of the felted fiber coated therewith, while allowing only the aqueous suspending medium to substantially penetrate the loosely matted fiber base, and then heating and compressing said coated fiber mat between embossing rolls heated in the temperature range of 180° to 450° F., said rolls being adjusted to impart to said matted fiber base sufficient pressure only to coalesce said rubber particles into an integral continuous film and to bond the uppermost fibers of said matted base while imparting thereto said embossed pattern, said heated rolls simultaneously effecting evaporation of a portion of the liquid suspending medium to set said coating to a degree sufficient to retain said embossed pattern.

2. The method of claim 1 wherein the coating composition is neoprene latex.

JACK C. GORDON.

REFERENCES CITED

The following references are of record in the file of this patent:

UNITED STATES PATENTS

| Number | Name | Date |
| --- | --- | --- |
| 1,985,203 | Charbonneau | Dec. 18, 1934 |
| 2,010,871 | Madge et al. | Aug. 13, 1935 |
| 2,193,498 | Schwartz et al. | Mar. 12, 1940 |
| 2,208,236 | Wiener | July 16, 1940 |
| 2,213,296 | Zinser | Sept. 3, 1940 |
| 2,244,097 | Burkart | June 3, 1941 |
| 2,314,162 | Reinhardt | Mar. 16, 1943 |
| 2,541,868 | Gordon | Feb. 13, 1951 |